United States Patent [19]

Samas et al.

[11] Patent Number: 5,158,404

[45] Date of Patent: Oct. 27, 1992

[54] TAPER THREAD CUTTING MACHINE AND METHOD

[75] Inventors: Mark V. Samas, Euclid; Edward D. Ricker, Chagrin Falls, both of Ohio

[73] Assignee: Erico International Corporation, Solon, Ohio

[21] Appl. No.: 334,333

[22] Filed: Apr. 7, 1989

[51] Int. Cl.⁵ ............................................... B23G 1/00
[52] U.S. Cl. .................................. 408/1 R; 408/168; 408/10; 408/158; 470/74; 470/66
[58] Field of Search ................. 408/73, 158, 1, 147, 408/102–104, 9, 10, 223, 224, 713, 64, 66, 62, 206, 207, 190, 194, 173, 161, 162, 163, 168, 169, 179, 118, 105, 49, 28, 22; 10/96 R, 96 T, 120.5, 87, 105; 364/474.02, 474.3; 409/76, 77, 75

[56] References Cited

U.S. PATENT DOCUMENTS

| Re. 23,684 | 7/1953 | Benninghoff et al. ............ 10/96 R |
|---|---|---|
| 448,971 | 3/1891 | Lumby ........................... 408/158 |
| 942,200 | 12/1909 | Gautschi ........................ 10/120.5 |
| 2,036,821 | 4/1936 | Munson ............................ 82/119 |
| 2,054,028 | 9/1936 | Benninghoff ................. 408/170 X |
| 2,219,944 | 10/1940 | Schoepe .......................... 408/62 |
| 2,583,094 | 1/1952 | Girz ............................ 10/96 T |
| 3,074,367 | 3/1965 | Lukens ........................... 82/110 |
| 3,829,920 | 8/1974 | Theuerkauf .................... 10/96 T |
| 4,079,235 | 3/1978 | Froyd et al. ................ 82/110 X |
| 4,213,722 | 7/1980 | Wagner ........................... 408/73 |
| 4,282,618 | 8/1981 | Wagner ....................... 10/120.5 R |
| 4,338,556 | 7/1982 | Hetzel .......................... 364/474.02 |
| 4,526,496 | 7/1985 | Kies et al. ..................... 408/179 |
| 4,531,866 | 7/1985 | Leonard, Jr. ................. 10/96 T X |
| 4,531,867 | 7/1985 | Benhase ...................... 408/713 X |
| 4,692,071 | 9/1987 | Hirota ............................ 408/9 |
| 4,789,943 | 12/1988 | Yamanaka et al. ............. 82/110 X |

FOREIGN PATENT DOCUMENTS

| 507286 | 6/1946 | Canada ........................... 408/147 |
|---|---|---|
| 0332975 | 9/1989 | European Pat. Off. ......... 364/474.3 |
| 1077378 | 11/1954 | France ........................... 10/120 |
| 420800 | 9/1966 | Switzerland .................... 408/158 |

Primary Examiner—Larry I. Schwartz
Assistant Examiner—Robert Schultz
Attorney, Agent, or Firm—Renner, Otto, Boisselle & Sklar

[57] ABSTRACT

A machine for taper threading the end of a bar such as reinforcing bar used in concrete construction utilizes a power operated vice to clamp and feed the bar end axially into a rotary head which contains chaser tooling holders which open uniformly on the bar end as the head rotates. The rotary head is axially stationary but contains an axially movable key or linear cam which engages a readily removable transversely extending control rod assembly in turn moving the chaser holders. Axial movement of the power vice and thus the bar end at a controlled axial speed with respect to the rotary speed of the head moves the key to cause the movement of the chaser holders. The chaser holders in addition to supporting the thread cutting chasers also support ahead of the chaser an indexable triangular insert to pre-cone the bar end. To change the set-up of the machine for different bar sizes the control rod is removed and replaced, and a proper cutting speed for the bar is selected by adjusting the RPM of the head through a transmission. The extent of axial movement of the key may also be controlled to optimize the cycle time of the machine. In this manner all bar sizes may be threaded in a single pass and set-up from bar size to bar size is accomplished quite simply in a short period of time.

53 Claims, 6 Drawing Sheets

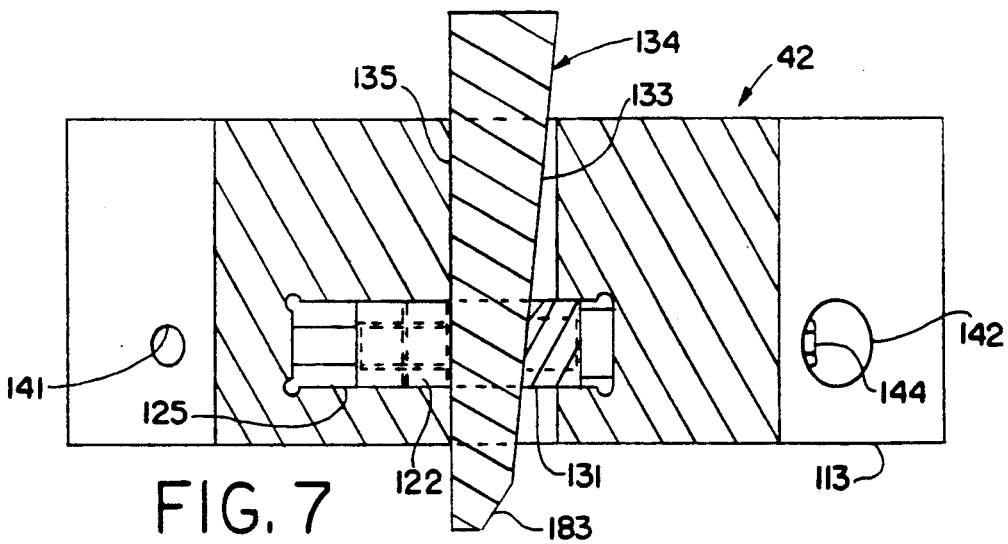
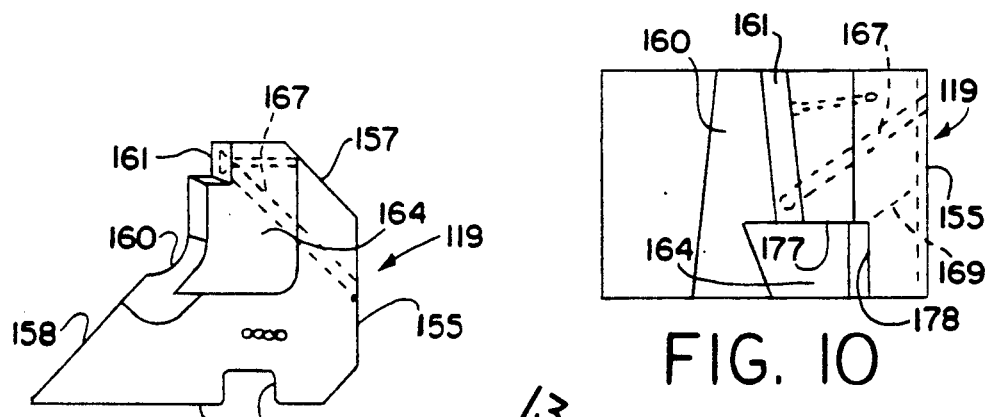
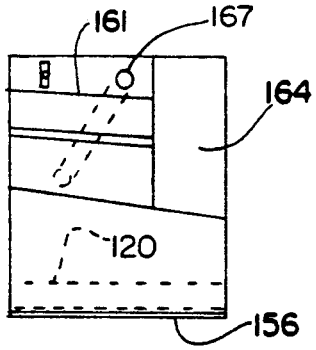
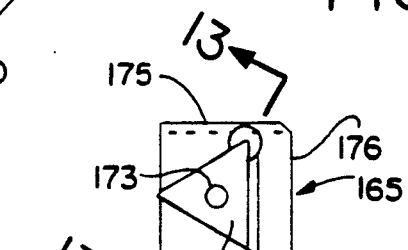
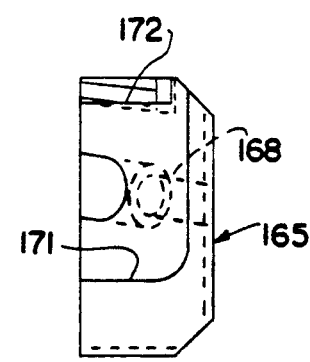
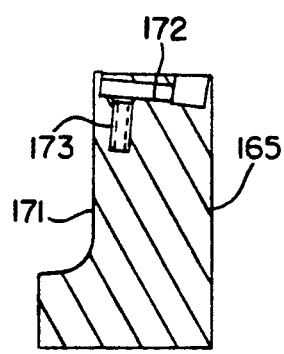

TAPER THREAD CUTTING MACHINE AND METHOD

This invention relates generally as indicated to a taper thread cutting machine and method and more particularly to a machine and method for cutting taper threads on bar ends.

BACKGROUND OF THE INVENTION

Taper thread splices or joints are widely employed on concrete reinforcing bar used in concrete construction. One well known such bar splice is sold under the trademark LENTON by Erico Products, Inc. of Solon, Ohio or Erico BV of Tilburg, Netherlands. The splice utilizes a coupler or sleeve having internal taper threads mating with precision taper threaded ends of the bars to form full tension butt splices. Such splices are available for all sizes of reinforcing bar from #3 (10 mm) to #18 (57 mm).

The taper threaded bar ends may be prepared on a bar threading machine such as shown in U.S. Pat. No. 4,526,496 and also sold under the trademark LENTON. Similar machines may be seen in prior U.S. Pat. Nos. 4,282,618 and 4,213,722.

The LENTON bar threaded utilized a rotary head with a square opening accommodating four interfitting chaser holders. The head is indexed axially of a fixed bar end. The chaser holders are moved in the head by an axially extending control key or linear cam through a spring held cam block mounted for sliding movement on a transverse rod. The control key includes projecting rollers which engage a ring.

While the machine described above satisfactorily forms precision tapered threads on bar ends, it may require several passes to form the threads on large bar ends. It also requires substantial and fairly complex changes or set-up to switch from one bar size to another. For example, up to four passes may be required for some bar sizes and set-up for a different bar size may require twenty to thirty minutes, and a skilled operator. On some bar sizes the chaser holders, cam blocks and springs have to be changed, and for each bar size the rather inaccessible control key requires changing. Moreover the bar ends usually have to be saw cut or otherwise prepared, rather than simply sheared.

The excessive work done by the chasers results in excessive wear and more frequent replacement, which again results in downtime or production inefficiency.

It would therefore be desirable to have a machine which would thread a bar end in one pass within an optimum cycle time and in which the set-up required for converting the machine from one bar size to another could be shortened and simplified.

SUMMARY OF THE INVENTION

A machine for taper threading the end of a bar such as reinforcing bar used in concrete construction utilizes a power operated vice to clamp and feed the bar end axially into a rotary head which contains chaser tooling holders which open uniformly on the bar end as the head rotates. The rotary head is axially stationary but contains an axially movable key or linear cam which engages a readily removable transversely extending control rod assembly in turn moving the chaser holders. Axial movement of the power vice and thus the bar end at a controlled axial speed with respect to the rotary speed of the head moves the key to cause the movement of the chaser holders. The chaser holders in addition to supporting the thread cutting chasers also support ahead of the chaser an indexable triangular insert to pre-cone the bar end. To change the set-up of the machine for different bar sizes the control rod is removed and replaced, and a proper cutting speed for the bar is selected by adjusting the RPM of the head through a transmission. The extent of axial movement of the key may also be controlled to optimize the cycle time of the machine. In this manner all bar sizes may be threaded in a single pass and set-up from bar size to bar size is accomplished quite simply in a short period of time.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 7 is a horizontal section of the head seen from the line 7—7 of FIG. 6;

FIG. 8 is an end elevation of a tool holder;

FIG. 9 is a side elevation of the tool holder;

FIG. 10 is a top plan view of the tool holder;

FIG. 11 is a somewhat enlarged end elevation of an insert holder which fits in the tool holder;

FIG. 12 is a top plan view of the insert holder;

FIG. 13 is a section of the insert holder seen from the line 13—13 of FIG. 12.

DETAILED DESCRIPTION OF THE PREFERRED EMBODIMENTS

Figure 1:
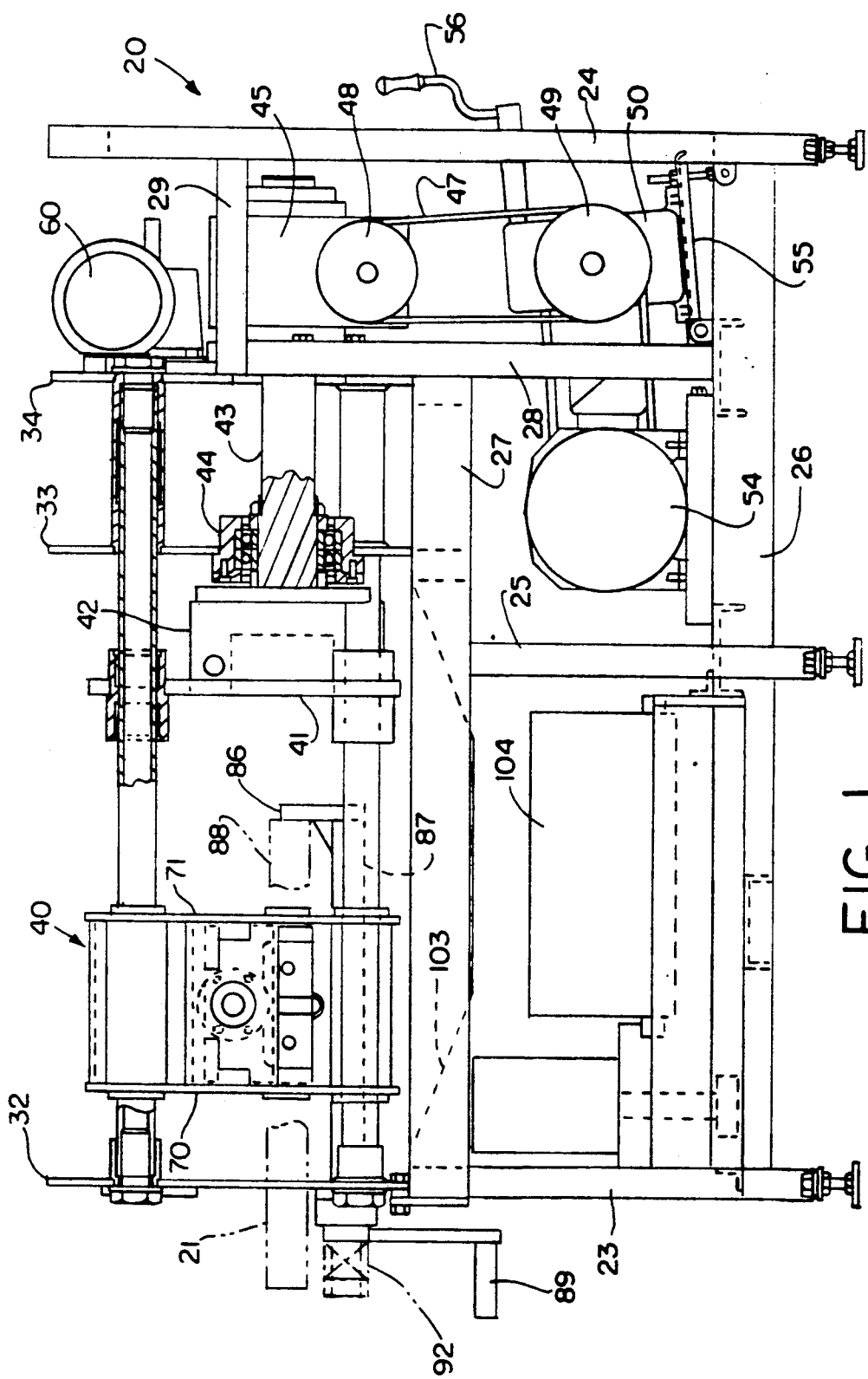
FIG. 1 is a side elevation of a machine in accordance with the present invention.
Figure 2:
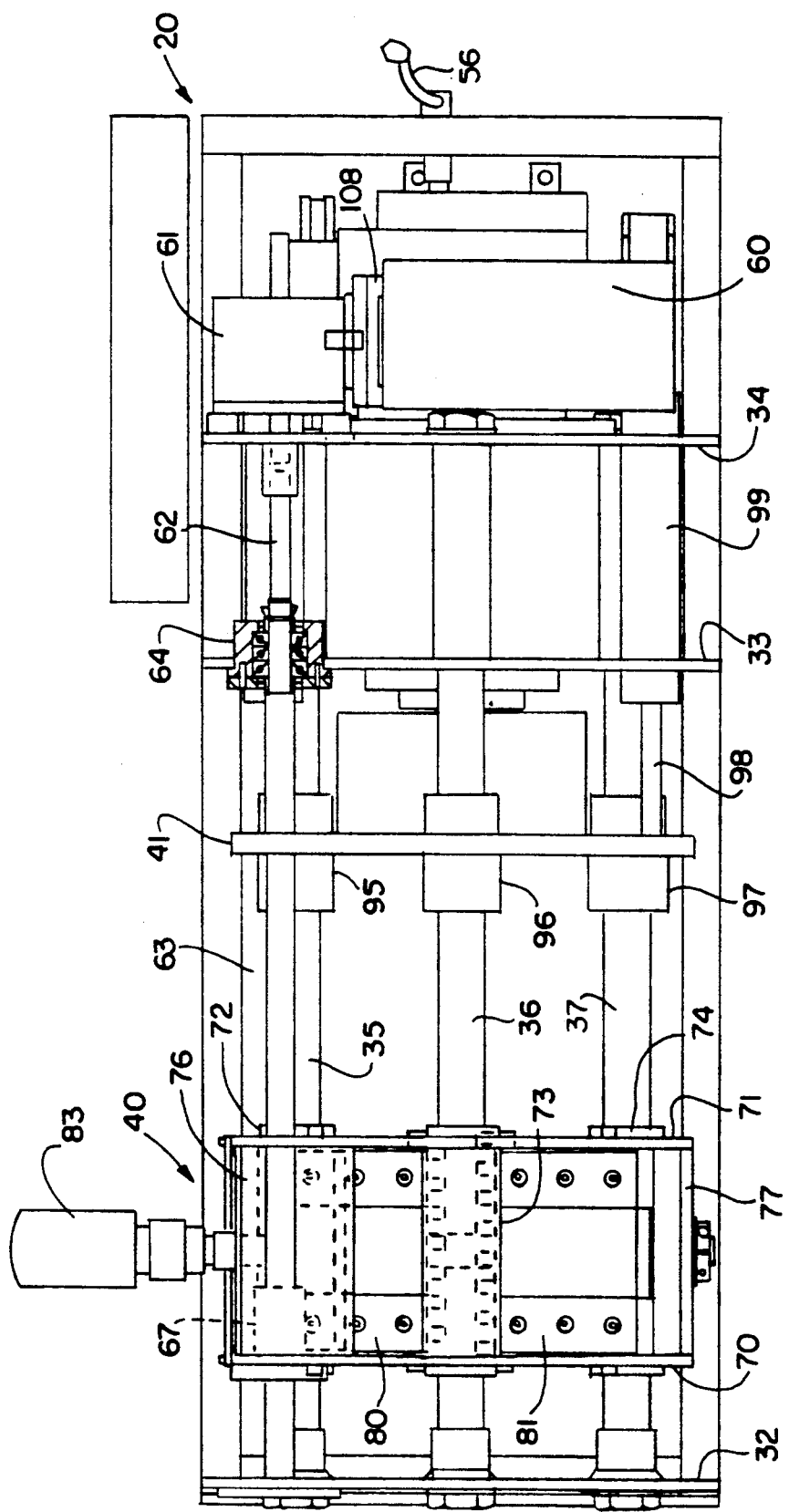
FIG. 2 is a top plan view of the machine.
Figure 4:
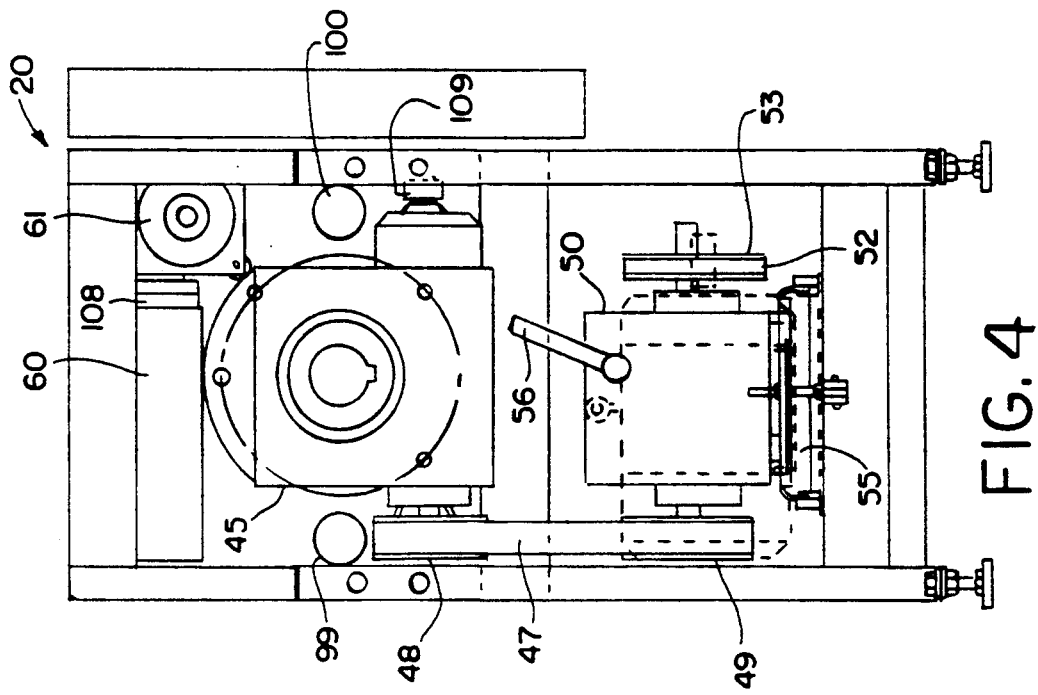
FIG. 4 is an end elevation of the opposite end.
Figure 3:
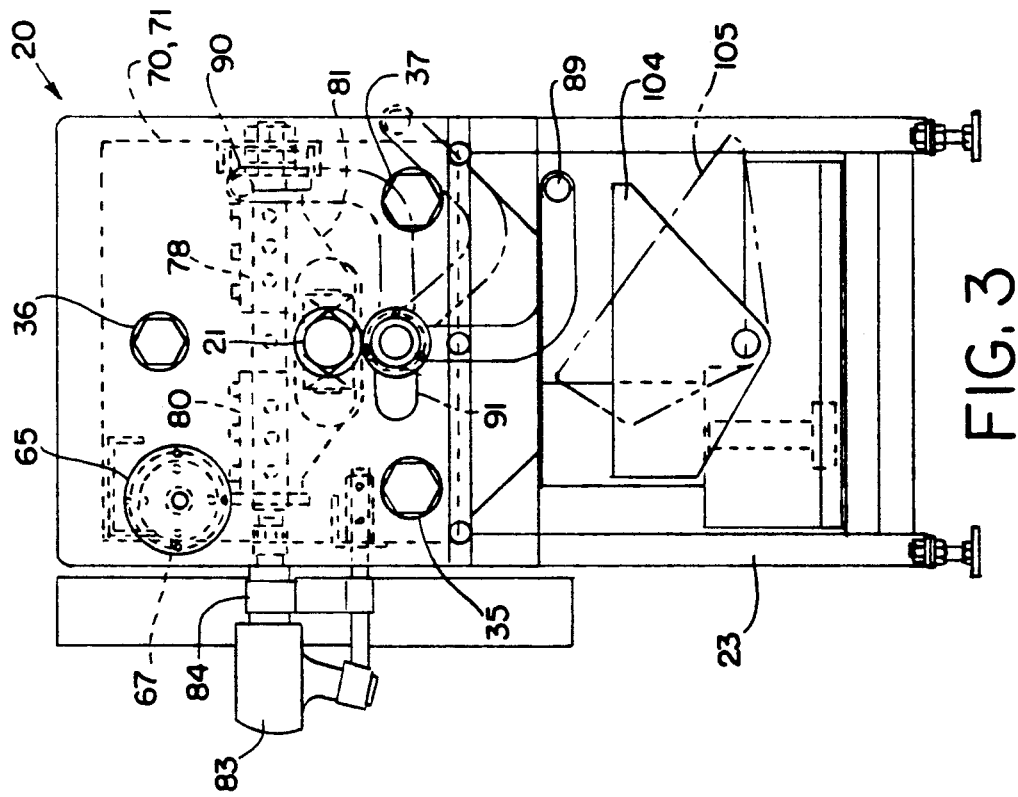
FIG. 3 is an end elevation of the machine as seen from the left hand side of FIGS. 1 and 2.

Referring first to FIGS. 1-4 there is illustrated a taper thread cutting machine shown generally at 20 for bar ends shown at 21 in FIGS. 1 and 3. The machine includes a frame having pairs of end legs 23 and 24 and a pair of middle legs 25. The legs support a lower horizontal frame 26. The paired legs 23 and 25 support a horizontal bed frame 27 at a somewhat elevated position with the bed frame extending between the paired legs 23 and vertical frame members 28, which extend from the lower horizontal frame 26 to elevated frame members, which is turn extend between the top of the frame members 28 and the end frame members 24.

Extending upwardly from the horizontal bed frame 27 are three vertical plates indicated at 32, 33 and 34 which are interconnected by three triangularly arranged horizontally extending tie rods 35, 36 and 37. The external surfaces of such tie rods are polished and mounted on such tie rods for horizontal movement is a bar vice assembly shown generally at 40 in FIGS. 1 and 2, and also a control ring 41. The control ring surrounds rotary machining head 42 which is mounted on spindle 43 journaled at 44 in the plate 33. The opposite end of the spindle 43 extends from worm gear reducer 45 mounted on plate 34. The worm gear of the reducer is driven by a cog belt 47 trained around sheaves 48 and 49, the former driving the worm gear while the latter is driven by speed change gear box 50, which is in turn driven by V-belt 52 trained around sheave 53 from spindle motor 54. The speed change gear box is mounted on a pivoting platform 55, the position of which may be adjusted to provided proper belt tension. The gear box 50 includes a gear shift handle seen at 56.

Mounted above the worm gear reducer 45 is a reversible variable speed DC motor 60 which drives a right angle gear box 61 which, through shaft coupler 62, rotates ball screw 63 which is journaled as indicated at 64 in plate 33 and by end cap 65 in plate 32. The ball screw 63 extends through a ball nut 67 which is part of the vice assembly 40.

As seen more clearly in FIGS. 1, 2 and 3 the vice assembly 40 comprises parallel vertical plates 70 and 71. The parallel plates are interconnected by hubs 72, 73 and 74 in which are mounted bushings supporting the vice assembly for linear movement on the rods 35, 36 and 37, respectively. The plates are also connected at each side by transverse frame members 76 and 77 in which is journaled an Acme screw 78 which has left hand threads on one end and right hand threads on the other end. Two jaw members seen at 80 and 81 include internal threads in mesh with the threads of the Acme screw so that rotation of the screw in opposite directions will move the jaw members toward and away from each other. The portions of the jaw members which engage the bar end 21 are offset below the Acme screw 78.

The Acme screw may be driven by a reversible electric motor seen at 83 mounted on bracket 84. As noted in FIG. 2 the jaws of the vice assembly are substantially elongated in the direction of the axis of the machine and thus grip the bar 21 over a substantial length. In any event the bar is gripped firmly and held against rotation by the jaws of the vice assembly.

The machine also includes a bar stop indicated at 86 in FIG. 1 which is mounted on a horizontally extending pivot shaft 87. The bar stop engages the projecting end of the bar 21 as seen at 88 and may be pivoted out of the way by handle 89. When the handle is elevated to the phantom line position seen at 90 in FIG. 3 the bar stop moves to the position seen at 91. As seen in FIG. 1 the bar stop 86 is urged to the left by a compression bumper material 92 in the event that the bar enters the machine by means of a powered conveyor.

A control ring 41 has secured thereto three hubs 95, 96 and 97 which house bushings which ride on the rods 35, 36 and 37, respectively. Also connected to the control ring are plungers 98 of spring plunger assemblies 99 and 100 (see FIG. 4). Such spring plunger assemblies, one diametrically on each side, urge the control ring 41 to the left as seen in FIG. 2 toward the vice assembly 40.

As seen in FIG. 1 the somewhat elevated bed frame 27 may include a chute 103 designed to funnel chips into bin 104, which at the end of the day or shift may be tilted to the phantom line position 105 so that it may be shoveled out.

Mounted on the DC motor 60 driving the ball screw 63 is a pulse generator indicated at 108 which reads the speed of the motor 60 and thus the RPM of the ball screw. Mounted on the worm gear reducer is an encoder 109 seen in FIG. 4 which measures the RPM of the spindle 43 and thus the machining head 42. The encoder 109 acts as a master while the pulse generator acts as a slave. A closed loop velocity controller uses these signals to direct the DC motor to follow at the proper speed ratio. Thus the controller which reads the RPM of the spindle translates that to a proper RPM for the ball screw and provides proper lead for the thread being formed by closely controlling axial movement of the bar with respect to the rotary speed of the spindle or machining head.

Figure 6:
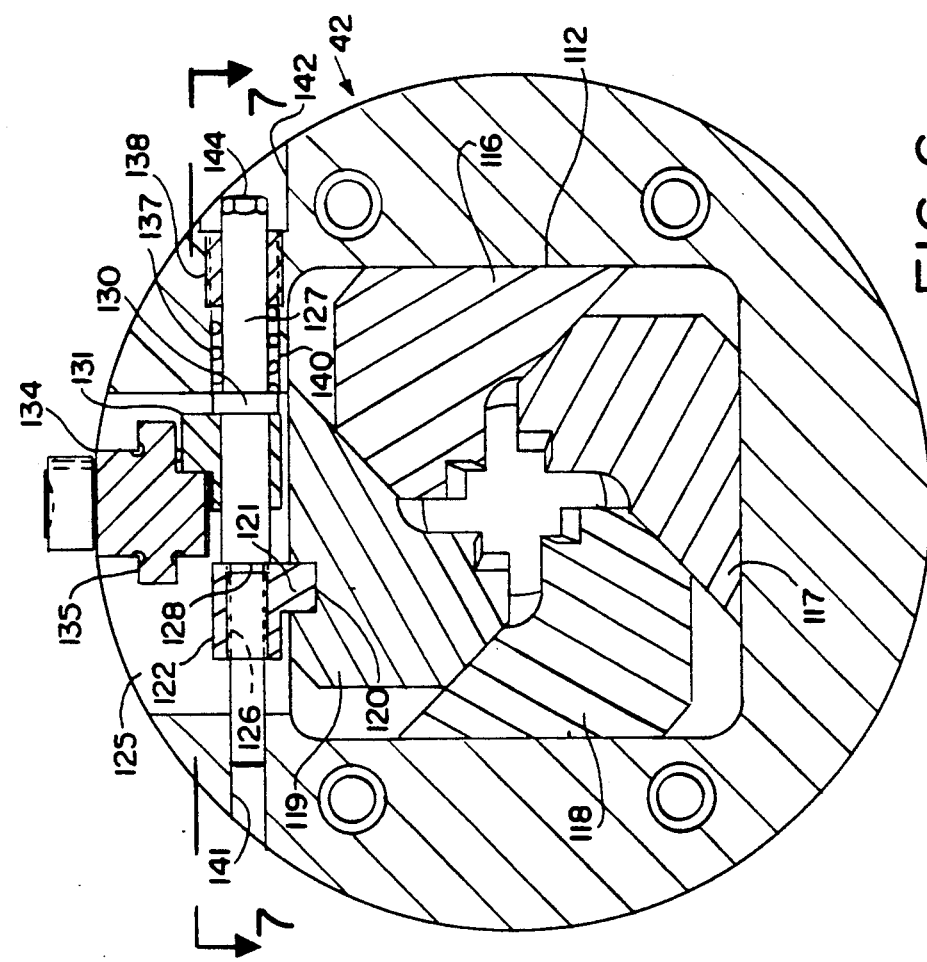
FIG. 6 is a transaxial section of the head as seen from the line 6—6 of FIG. 5.
Figure 5:
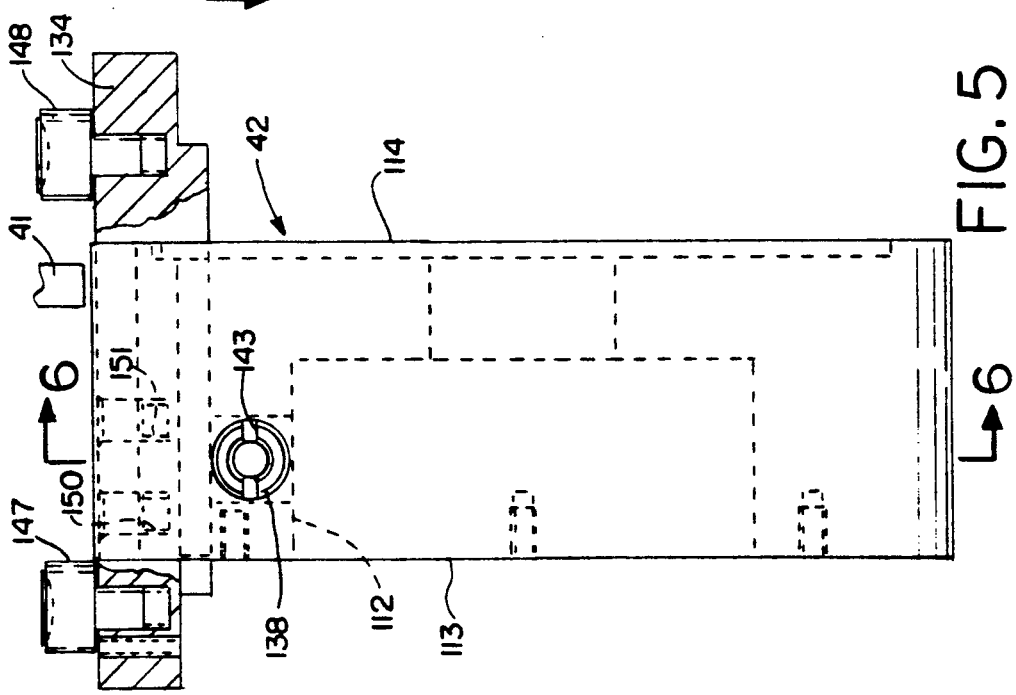
FIG. 5 is an enlarged side elevation of the rotary machining head illustrating at the top the axially movable key or linear cam.

Referring now to FIGS. 5, 6 and 7 there is illustrated the rotary machining head 42 which includes a square recess 112 which is open to the face 113 of the head. The cutting head is mounted on the end of the spindle which extends from the opposite face 114. The recess includes four planar interior walls with opposite walls being parallel to each other and each wall being parallel to the axis of the machine or spindle. Mounted within the recess known as the cutting square are four tool holders seen at 116, 117, 118 and 119 which interfit not only with the walls of the cutting square but also with each other so that opening or closing movement of one concurrently opens or closes all.

One of the tool holders indicated at 119 is provided with a slot 120 in which is positioned a lateral extension 121 of control block 122. The control block is a projection of the tool holder and is positioned in radially extending slot 125 and is internally threaded to receive the external threads seen at 126 on control rod 127. The control rod includes a stop shoulder 128 abutting against the control block 122.

The control rod 127 also includes an annular stop shoulder 130. The control rod extends through and the annular top shoulder abuts against a thrust block 131 which includes an upwardly extending projection bearing against linear cam surface 133 of control key 134. The control key is mounted for movement axially of the head in slot 135.

Surrounding the control rod on the opposite side of the annular stop shoulder 130 is a compression spring 137 which extends between the annular stop shoulder and threaded bushing 138. The control rod extends through transverse passage 140 in the rotary head and the threaded bushing is threaded into the outer end of the passage. The opposite end of the control rod extends through a smaller aligned transverse passage 141. The transverse passage 140 opens laterally of the rotary head through the slightly enlarged opening 142. As indicated, the projecting end of the threaded bushing may be produced with a transverse slot seen at 143 in FIG. 5 while the projecting end of the control rod may be provided with flats seen at 144. In this manner a suitable tool on a speed wrench may readily remove or replace both.

It can now be seen that the distance between the annular stop shoulder 130 and the stop shoulder 128 is fixed by the control rod. This dimension then controls the spacing between the linear cam surface and the control block or projection extending from one of the tool holders. For each bar size there will be a different control rod with a different dimension between the two stop shoulders. To change control rods the threaded bushing is removed simply by unscrewing it. Then the control rod is unscrewed from the projection or control block 122 and replaced by a control rod having a different dimension. The compression spring is then seated over the annular stop shoulder and the threaded bushing is replaced. Although it will be appreciated that the spacing may be changed by simply rotating the control rod in the projection, it is preferred to provide two set stop shoulders so that the control rod is inserted to a stop position thus avoiding care or skill in changing the machine from one bar size to another.

As seen in FIG. 5 the axially movable control key is provided with two cam rollers 147 and 148 which are positioned on opposite sides of the control ring 41. The control key may also include threaded tapped holes seen at 150 and 151 providing alternate locations for the roller 147 to shorten the stroke of the machine and thus provide optimum cycle time depending upon the bar size being threaded.

Referring now to FIGS. 8, 9 and 10 there is illustrated a chaser or tool holder 119 in accordance with the present invention. The tool holder comprises a block which includes right angled planar exterior surfaces 155 and 156 which cooperate with the internal walls of the cutting square and angled walls 157 and 158 which cooperate with the walls 158 and 157, respectively, on adjoining blocks. The wall 156 may be provided with the slot 120 receiving the projection or control block. The block is relieved as indicated at 160 and is provided with an angled shoulder 161 to receive the chaser.

The front of the tool holder or that side which extends toward the face 113 of the rotary head includes a recess 164 in which is positioned an insert holder 165 shown in more detail in FIGS. 11, 12 and 13. Each chaser is held to the tool holder by a suitable pin fastener extending through the chaser and into the hole indicated at 167 while the insert holder is held to the holder by a suitable fastener extending through hole 168 in the insert holder and threaded into the holder in a suitable tapped hole, the axis of which is shown at 169 at FIG. 10.

The insert holder comprises a generally rectangular block which is relieved as indicated at 171. The relieved end of the block is provided with a triangular seat 172 which is a slight angle to the end face of the insert holder. The seat is provided with a tapped hole indicated at 173 so that a triangular roughing or pre-coning cutting tool may be secured to the seat. When the insert holder is positioned in the tool holder the surfaces 175 and 176 seen in FIG. 12 will abut against the surfaces 177 and 178 of the recess of the tool holder as seen in FIG. 10.

In FIGS. 14-18 there is illustrated the triangular indexable pre-coning insert 180 mounted in the insert holder 165 and there is also illustrated a chaser 181 with both the insert holder and chaser being mounted in the tool holder 119.

In operation, the vice assembly moves the bar end 21 to the right as seen in FIGS. 14-18 and as the vice assembly moves the bar end, the vice assembly picks up the control ring 41 which also moves to the right in turn engaging the cam roller 148 moving the control key 134 axially in turn to move the tool holders.

Figure 14:
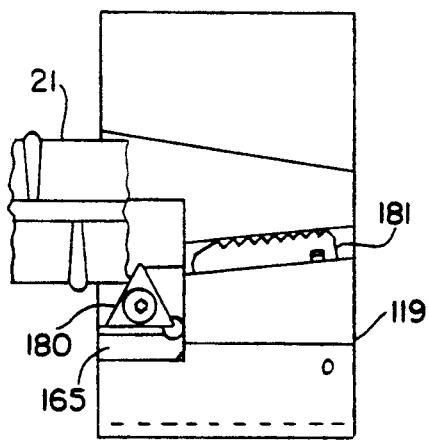
FIGS. 14-18 are sequence illustrations illustrating the action of the pre-coning inserts and chasers supported by the tool holder as the bar is moved into the rotary head to thread a bar end in a single pass.
Figure 15:
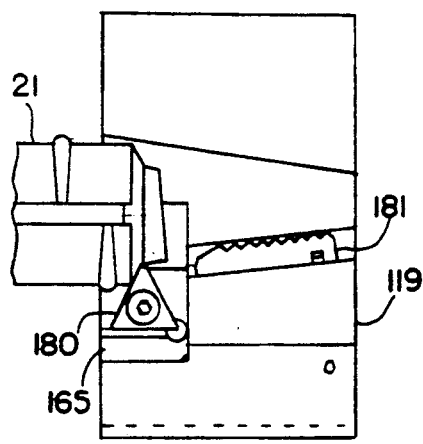

As seen in FIG. 14 the bar end 21 which is unsawcut or unprepared otherwise is entering the cutting head as the cutting head rotates. The bar is initially engaged by the edge of the triangular pre-coning cutting tool 180. As seen in FIG. 15 the indexable cutting insert 180 is beginning to cut the bar end or to pre-cone the bar end.

Figure 16:
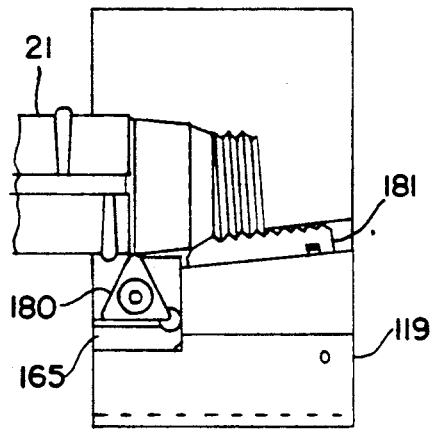

In FIG. 16 the chasers have begun to engage the pre-coned bar end while the triangular insert is still cutting or pre-coning the bar end.

Figure 17:
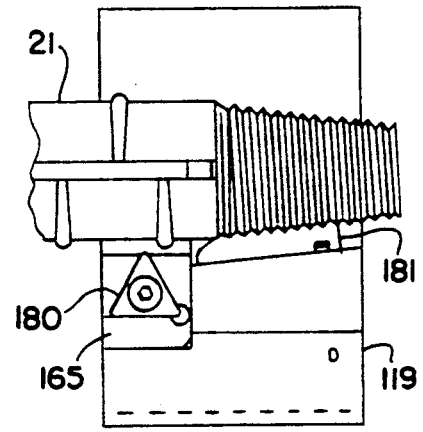
Figure 18:
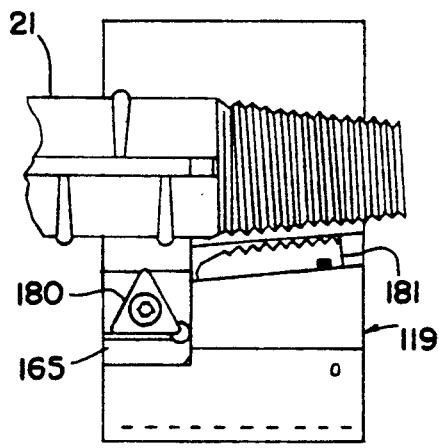

In FIG. 17 the chaser is approaching the end of the threading cycle and the triangular cutting tool has disengaged the work. In FIG. 18 at the end of the cycle the thrust block reaches the pop off ramp 183 of the key seen in FIG. 7 and the chasers clear the end of the bar to permit the withdrawal of the bar end. As soon as the pop off occurs the cycle is completed and the vice withdraws the bar end with the spring plungers retracting the control ring 41 by engaging the opposite cam roller which as indicated may be set positionally to obtain an optimum cycle for the machine depending upon the bar size being threaded. In the above described manner the machine will thread any bar size in a single pass and the only set-up requirement other than adjustments on the control panel required by the operator is to replace the control rod with a control rod having a different shoulder-to-shoulder dimension and, for some size bars, to change the speed of the transmission through gear shift handle 56.

With the triangular pre-coning insert there is avoided multiple passes for larger bars when there is lots of material to be removed. This significantly shortens the cycle time on larger size bars and moreover provides a significant increase in the life of the chaser. When the tip or the edge of the pre-coning insert becomes dull it may simply be indexed to present another tip or cutting edge to the work.

The total machine then comprises the machine illustrated an a complete set of control rods, one for each size of bar to be threaded.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. In combination, a taper threading machine for taper threading the ends of workpieces of different sizes and a set of control means wherein said machine comprises a frame, and a rotary machining head having an axis mounted on said frame; wherein said rotary machining head includes:
   an internal recess having planar walls;
   a plurality of tool holders in said recess in engagement with said walls and each other for opening and closing movement,
   an axially extending linear cam,
   a projection projecting from one of said tool holders,
   a thrust block in engagement with said cam, and a selected one of said set of control means interposed between said projection and said thrust block to set the distance therebetween
each of said set of control means providing a different such distance, one for each size workpiece.

2. The combination set forth in claim 1 wherein each control means comprises a removable rod extending transversely of the axis of the machining head.

3. The combination set forth in claim 2 including means removably to secure each rod to said projection.

4. The combination set forth in claim 3 wherein said last mentioned means comprises a threaded connection and a projection-rod stop shoulder.

5. The combination set forth in claim 4 wherein said rod includes a thrust block stop shoulder adapted to engage said thrust block.

6. The combination set forth in claim 5 wherein the axial dimension between said shoulders along said rod is different for each rod.

7. The combination set forth in claim 6 wherein said thrust block shoulder is annular and said rod extends through said thrust block.

8. The combination set forth in claim 7 including a compression spring seated against said annular shoulder urging said rod against said thrust block and said thrust block in turn against said cam, said spacing said projection the selected dimension.

9. The combination set forth in claim 8 wherein said spring encircles said rod and extends between said annular shoulder and a removable bushing.

10. The combination set forth in claim 9 wherein said rod is mounted in a passage in said rotary head extending transversely of the axis of said head, and said removable bushing is threaded in the end of said passage.

11. The combination set forth in claim 1 including a vice for holding the workpiece, and means to move said vice and thus the workpiece axially into said head.

12. The combination set forth in claim 11 wherein said means comprises a nut attached to said vise assembly, and a rotary screw extending through said nut.

13. The combination set forth in claim 12 including means to read the RPM of the machining head and rotate said rotary screw accordingly.

14. The combination set forth in claim 1 wherein said tool holders each include removable chasers supported at a uniform taper angle, said tool holders further including a removable insert supporting preconing means for preconing such work for engagement by said chasers.

15. The combination as set forth in claim 14 wherein said preconing means is a triangular cutting tool having three cutting edges.

16. The combination as set forth in claim 15 including means to remove said triangular cutting tool from said insert to enable indexing of said cutting tool to present a different cutting edge to the work as an edge wears.

17. A tapered thread cutting machine for threading work of different size comprising a rotary machining head having an axis of rotation including a recess having planar interior walls, each parallel to the axis of the head, a plurality of tool holders in said recess engaged with said walls and each other for opening and closing movement in response to movement of one of said holders, a projection on said one of said holders, a spring loaded control rod extending transversely of said axis of rotation of said head and removable secured to said projection and including a thrust shoulder, a thrust block entirely guided for linear movement and engaging said thrust shoulder, an axially extending control key having a linear cam surface in engagement with said thrust block whereby axial movement of said control key moves said control rod and thus said tool holders, said set-up change means to vary the distance between said thrust block and said projection to thread work of different size.

18. A cutting machine as set forth in claim 17 wherein said control rod is threaded into said projection and said set-up change means rotates said control rod to vary said distance.

19. A cutting machine as set forth in claim 17 wherein said control rod is threaded into said projection against a stop shoulder on said rod, and said set-up change means comprises another control rod having a different dimension between said stop shoulder and said thrust shoulder.

20. A cutting machine as set forth in claim 19 wherein said rod thrust shoulder is a thrust block stop shoulder adapted to engage said thrust block.

21. A cutting machine as set forth in claim 20 wherein the axial dimension between said shoulders along said rod is different for each rod.

22. A cutting machine as set forth in claim 21 wherein said thrust block shoulder is annular and said rod extends through said thrust block.

23. A cutting machine as set forth in claim 22 wherein the spring loading of said rod is provided by a compression spring seated against said annular shoulder urging said rod against said thrust block and said thrust block in turn against said cam, and spacing said projection the selected dimension.

24. A cutting machine as set forth in claim 23 wherein said spring encircles said rod and extends between said annular shoulder and a removable casing.

25. A cutting machine as set forth in claim 24 wherein said rod is mounted in a passage in said rotary head extending transversely of the axis of the head, and said removable bushing is threaded in the end of said passage.

26. A cutting machine as set forth in claim 17 including a vice for holding the workpiece and means to move said vice and thus the workpiece axially into said head.

27. A cutting machine as set forth in claim 26 wherein said last mentioned means comprises a rotary screw and nut.

28. A cutting machine as set forth in claim 27 including means to read the RPM of the machining head and rotate said rotary screw accordingly.

29. A cutting machine as set forth in claim 26 including a control ring surrounding said rotary head and movable with said vice.

30. A cutting machine as set forth in claim 29 including roller means on said key operative to engage said control ring to move said key with the workpiece as it enters the head.

31. A cutting machine as set forth in claim 30 including spring means to retract said key as the workpiece is withdrawn from the head.

32. A cutting machine as set forth in claim 31 wherein said spring means comprises diametrically opposed spring plungers.

33. A cutting machine as set forth in claim 32 including roller means on said key on opposite sides of said control ring, and means to vary the spacing of said roller means to optimize the cycle of the machine.

34. A taper thread cutting machine for cutting taper threads on the end of a bar comprising a rotary head having an axis, a plurality of interfitting chaser holders mounted in said head for rotation therewith and for uniform closing movement, actuator means for actuating said interfitting chaser holders, clamp means for clamping a bar end centered with respect to said head against rotation, stop means for positioning a bar end for clamping, feed means for feeding said clamp means and thus the bar end axially into said head as the head rotates, first drive means for driving said feed means axially at a first speed, second drive means distinct from said first drive means for driving said rotary head rotationally at a second speed, and speed-control means for controlling a read speed of said first drive means in response to the speed of said second drive means to ensure uniform pitch for the thread being cut.

35. A thread cutting machine as set forth in claim 34 including control means driven by said feed means to move said chaser holders uniformly as said clamp means feeds the bar axially into said rotary head.

36. A thread cutting machine as set forth in claim 35 wherein said first drive means comprises a nut attached to said clamping means and a ball screw extending through said nut.

37. A thread cutting machine as set forth in claim 36 wherein said means to clamp the bar comprises opposed screw operated vice jaws.

38. A thread cutting machine as set forth in claim 34 including means to move said stop out of the path of said bar prior to the cutting cycle of the machine.

39. A tapered thread cutting machine for threading work comprising a rotary machining head having an axis and including a square recess having four planar interior walls each parallel to the axis of the head, a plurality of tool holders in said recess engaged with said walls and each other for opening and closing movement in response to movement of one of said tool holders, said tool holders each including removable chasers supported at a uniform taper angle, said tool holders further including a removable insert supporting pre-coning means for pre-coning such work for engagement by said chasers, said pre-coning means having a triangular cutting tool having three cutting edges, and means supporting said cutting tool on said insert for convenient indexing to prevent a new edge to the bar as one edge wears.

40. A machine as set forth in claim 38 including means to remove said triangular cutting tool from said insert to enable indexing of said cutting tool to present a different cutting edge to the work as an edge wears.

41. A set-up process for a taper thread cutting machine for work of different size of the type having a rotary machining head having an axis and including a recess having planar walls accommodating a plurality of tool holders engaged with the walls and each other for opening and closing movement, a projection on one of said holders, and one of a set of control rods removable secured to said projection each including a thrust block stop shoulder for engaging a thrust block which in turn engages a linear cam movable axially of said head to close said tool holders uniformly on the work, said control rod having a predetermined shoulder-projection dimension from said projection to said shoulder, said dimension being related to the size of the work, the set-up process comprising the steps of: removing said one control rod; and installing another selected control rod of said set dimensioned to provide a different shoulder-projection dimension.

42. A process as set forth in claim 41 wherein said installing step includes threading the selected control rod into said projection against a projection stop shoulder, and positioning a spring against said thrust-block stop shoulder to force said thrust-block stop shoulder against said thrust block and to set the position of said projection and thus said tool holders.

43. A process as set forth in claim 42 wherein said installing step includes positioning the selected control rod in a passage in said machining head extending transversely of the axis of said head, and closing said passage with a threaded bushing to compress said spring against said thrust-block stop shoulder.

44. A process as set forth in claim 43 including the step of limiting the axial movement of said linear cam to optimize the cycle time of the machine.

45. A taper thread cutting machine for different size reinforcing bars and the like comprising a rotary head having an axis and having an internal cavity with planar walls, a plurality of interfitting chaser holders mounted in said cavity for uniform movement along said planar walls as a bar moves axially within the head; a longitudinally extending cam engagement a set means which engages one of said holders for moving each of said holders uniformly; said cam including profile means for controlling the taper angle of the thread, said chaser holders having a starting position; and said set means being entirely guided for linear movement and for setting said starting position of said chaser holders with respect to said cam to cut threads on such different size bars.

46. A cutting machine as set forth in claim 45 wherein said last mentioned means comprises a set of control rods, one for each size bar.

47. A cutting machine as set forth in claim 46 wherein each control rod is threaded to a set stop.

48. A cutting machine as set forth in claim 47 including a transversely extending threaded bushing in said rotary head removable to obtained access to the control rod.

49. A cutting machine as set forth in claim 48 including a spring between said bushing and said control rod, and said set means includes a thrust block on said control rod in engagement with said cam.

50. A process for cutting taper threads on the end of a bar comprising the steps of gripping the bar in a vise; rotating a machining head having an axis and including a plurality of tool holders each being movable uniformly radially for opening and closing movement, each tool holding including a chaser and an insert holder for a pre-coning cutting tool having plurality cutting edges; and axially moving said vise and thus the bar gripped by said vise towards said machining head and actuating said machining head so that the pre-coning cutting tool engages the bar end initially to cut a conical surface on the bar which is then engaged by the chaser to cut threads on such conical surface, and said process further comprising the step of supporting the pre-coning cutting tool on said tool holder for convenient indexing to present a new edge to the bar as one edge wears.

51. A process as set forth in claim 50 wherein the relative movement of the bar and machining head is controlled in response to the RPM of the machining head.

52. A process as set forth in claim 50 including the step of uniformly opening said tool holders in response to the relative movement between the bar and the machining head.

53. A process as set forth in claim 50 including the step of setting an initial position of said tool holders for each bar size.

* * * * *